United States Patent [19]

Minami

[11] 4,111,010
[45] Sep. 5, 1978

[54] AUTOMOTIVE INTERNAL COMBUSTION ENGINE

[75] Inventor: Hidehiro Minami, Yokohama, Japan

[73] Assignee: Nissan Motor Company, Limited, Japan

[21] Appl. No.: 663,059

[22] Filed: Mar. 2, 1976

[30] Foreign Application Priority Data

Mar. 7, 1975 [JP] Japan .............................. 50-31753[U]
Mar. 24, 1975 [JP] Japan .................................. 50-35070

[51] Int. Cl.² ............................................. F02B 75/10
[52] U.S. Cl. ........................................ 60/276; 60/284; 60/285; 123/117 A
[58] Field of Search ................ 60/274, 276, 285, 284; 123/117 A, 119 F, 119 EC

[56] References Cited
U.S. PATENT DOCUMENTS

| | | | |
|---|---|---|---|
| 2,071,633 | 2/1937 | Hunt | 123/119 F |
| 3,106,820 | 10/1963 | Schaffer | 60/290 |
| 3,447,518 | 6/1969 | Walker | 123/119 F |
| 3,732,696 | 5/1973 | Masaki | 60/286 |
| 3,791,144 | 2/1974 | Lang | 60/285 |
| 3,813,877 | 6/1974 | Hunt | 60/284 |
| 3,923,023 | 12/1975 | Ito | 123/117 A |
| 3,949,551 | 4/1976 | Eichler | 60/285 |

Primary Examiner—Douglas Hart
Attorney, Agent, or Firm—Robert E. Burns; Emmanuel J. Lobato; Bruce L. Adams

[57] ABSTRACT

In an automotive internal combustion engine equipped with an exhaust cleaning catalytic converter and a mixture control system to control the richness of the mixture toward a predetermined air-to-fuel ratio that will enable the catalytic converter to produce a maximum conversion efficiency, means are provided to disable the mixture control system and/or reduce the spark advance degrees under low-temperature operating condition of the engine.

1 Claim, 7 Drawing Figures

AUTOMOTIVE INTERNAL COMBUSTION ENGINE

BACKGROUND OF THE INVENTION

The present invention relates to internal combustion engines of automotive vehicles and, particularly, to a gasoline-powered automotive internal combustion engine of the type using a catalytic converter in the exhaust system thereof for exhaust cleaning purposes. More particularly, the present invention is concerned with a method of improving the performance of an internal combustion engine of the specific type or the exhaust cleaning performance of the catalytic converter of the engine during cranking at low temperatures and further with an internal combustion engine adapted to put such a method into practice.

Some modernized automotive vehicles are equipped with catalytic converters in the exhaust systems of the engines for the purpose of converting toxic air contaminants in the exhaust emissions into harmless compounds before the emissions are discharged to the open air. A typical example of such catalytic converters is the one using an oxidative catalyst which is especially effective to re-oxidize the unburned combustile compounds such as hydrocarbons (HC) and carbon monoxide (CO) contained in the exhaust gases emitted from the engine cylinders. The oxidative catalyst is not only reactive to these combustible compounds but is operable to reduce nitric oxides ($NO_x$) in the exhaust gases if the exhaust gases to be processed by the catalyst are conditioned to have a chemical composition within a certain range which is dictated by the air-to-fuel ratio of the mixture supplied to the engine cylinders. The catalytic converter using the oxidative catalyst thus exhibits tripple effects to the exhaust gases of an internal combustion engine and is capable of reducing the most important air contaminative sources of engine exhaust emissions in a single unit when the combustible mixture to be supplied to the engine cylinders is proportioned to have an air-to-fuel ratio within the certain range. Experiments have revealed that it is the stoichiometric air-to-fuel ratio of about 14.8:1 that enables the tripple-effect or "three-way" catalytic converter to produce its maximum conversion efficiency against the three kinds of air contaminative compounds. It is, for this reason, desirable to provide in an internal combustion engine using a tripple-effect catalytic converter suitable mixture control means adapted to regulate the air-to-fuel ratio of the mixture produced in the mixture supply system of the engine toward the stoichiometric level or maintain the air-to-fuel ratio of the mixture within a predetermined range containing the stoichiometric value.

The mixture control means thus used in combination with a tripple-effect catalytic converter was initially of a so-called "open-loop" type which operates without respect to the conditions of the exhaust gases that vary in composition and temperature depending upon the operational and ambient conditions of the engine. Difficulties were encountered in accurately controlling the air-to-fuel ratio by the use of such mixture control means because the density and viscosity of the fuel delivered to the mixture supply system of the engine are subject to fluctuation due to the fluctuations in the pressure and temperature of atmospheric air, the temperature of the fuel fed to the mixture supply system and other operational and ambient conditions of the engine. The fluctuations in the air-to-fuel ratio of the mixture result in fluctuations in the concentrations of the air contaminative compounds in the exhaust gases emitted from the engine cylinders.

To provide a solution to the problems arising from the use of mixture control means of the open-loop type, a mixture control system of a "closed-loop" or "feedback" type has been proposed which is adapted to control the air-to-fuel ratio of the mixture on the basis of information fed back from the exhaust system.

A mixture control system of the closed-loop or feedback type involves an exhaust sensor operative to detect the concentration of a prescribed type of chemical component contained in the exhaust gases from the engine cylinders and produce an analog output signal, usually in the form of voltage, indicative of the detected concentration of the particular chemical component in the exhaust gases. The chemical composition of exhaust gases is a faithful representation of the air-to-fuel ratio of the mixture delivered to the engine cylinders and, for this reason, the mixture control system of the closed-loop or feedback type is capable of accurately and constantly monitoring the actual air-to-fuel ratio of the mixture produced in the mixture supply system of the engine. The air-to-fuel ratio of the mixture supplied to the engine cylinders is thus accurately regulated at all times toward the stoichiometric level or maintained within a certain narrow range containing the stoichiometric level irrespective of the fluctuations in the various operational and ambient conditions of the engine. As the chemical component of the exhaust gases to be detected, any one or more of oxygen, carbon monoxide, carbon dioxide, hydrocarbons and nitric oxides may be selected although oxygen is preferred for ease of detection. The catalytic converter has been assumed to be of the tripple-effect type in the foregoing description but the essential features of the mixture control system of the closed-loop or feedback type can be exploited not only in an internal combustion engine arranged with a tripple-effect catalytic converter but when combined, in effect, with another type of catalytic converter reactive to one or two of the above-mentioned three types of air contaminative compounds if the mixture control system is designed and arranged in such a manner as to regulate the air-to-fuel ratio of the mixture toward a predetermined value which is optimum for the particular function of the converter or maintain the air-to-fuel ratio of the mixture within a certain range containing such a predetermined value.

By virtue of the mixture control means of the closed-loop or feedback type, the catalytic converter in the exhaust system of a gasoline-powered internal combustion engine is enabled to produce its maximum exhaust cleaning performance under various modes of operation of the engine because the air-fuel mixture supplied to the engine cylinders is at all times proportioned to have an air-to-fuel ratio optimum for the intrinsic function of the catalytic converter. As will be readily understood by those skilled in the art, however, controlling the air-to-fuel ratio of combustible mixture toward a fixed value throughout the varying operating conditions of the engine create problems during some modes of operation of the engine. During cranking of the engine at low temperatures, for example, it is desirable to have more than normal amounts of fuel delivered to the air stream through the mixture supply system so as to enrich the air-fuel mixture to be produced in the mixture supply system and to enable the fuel to readily evaporate in the system, as is well known in the art. If the mixture is produced under the control of the feedback mixture control system during such a condition of the engine, the mixture could not be made richer than the mixture having the air-to-fuel ratio provided by the control system and, as a consequence, will cause the engine to fail to properly operate.

The exhaust sensor incorporated into the mixture control system of the above described nature is usually composed of an electrolytic element of sintered zirconium oxide coated with microporous layers of platinum if oxygen is selected as the chemical component whose concentration in the exhaust gases is to be detected. The electrolytic element is oxygen ion conductive at temperatures within a certain range of, for example, 400° C. to 900° C. and produces between the layers of platinum a voltage that varies with the difference between the partial pressures of oxygen to which the platinum layers are exposed, viz., the difference between the concentration of oxygen in the exhaust gases and the concentration of oxygen in the atmospheric air. When, therefore, the temperature of the exhaust gases is lower than such a range during cranking of the engine, the exhaust sensor is disabled from producing a reliable output signal which faithfully indicates the concentration of the oxygen content in the exhaust gases passed through the exhaust sensor and, as a consequence, the reliability of the mixture control system as a whole is critically impaired. This, in turn, results in deterioration of the performance efficiency of the catalytic converter and, coupled with the fact that the engine tends to emit more than normal quantities of hydrocarbons and carbon monoxide during cranking, gives rise to an increase in the total concentration of the air contaminative compounds in the exhaust gases discharged to the open air. These problems are also encountered more or less in an internal combustion engine arranged with a mixture control system using another type of exhaust sensor reactive to carbon monoxide or dioxide, hydrocarbons or nitric oxides in the exhaust gases.

SUMMARY OF THE INVENTION

The present invention contemplates elimination of all the above described drawbacks of prior art internal combustion engines arranged with catalytic converters and mixture control systems of the closed-loop or feedback type by temporarily disabling the mixture control system during cranking of the engine and/or raising the combustion temperatures in the engine cylinders and accordingly the temperature of the exhaust gases by reducing the degrees of spark advance in the ignition system of the engine being cranked for starting from cold condition.

In accordance with one important aspect of the present invention, there is provided, in an automotive internal combustion engine including a mixture supply system for producing a mixture of air and fuel to be delivered into the engine cylinders, an air-flow control valve for reducing the flow of air into the mixture supply system under low-temperature operating condition of the engine, and an exhaust system having incorporated therein a catalytic converter which is reactive to at least one type of air contaminative compound in the exhaust gases passed through the exhaust system and which is capable of producing a maximum conversion efficiency against the exhaust gases resulting from a mixture having a predetermined air-to-fuel ratio, a method of controlling the air-to-fuel ratio of the mixture to be produced in the mixture supply system, comprising monitoring the air-to-fuel ratio of the mixture produced in the mixture supply system through detection of the concentration of at least one type of chemical component in the exhaust gases passed through the exhaust system, producing a signal representative of the detected concentration of the chemical component, and regulating the air-to-fuel ratio of the mixture to be produced in the mixture supply system toward the above-mentioned predetermined air-to-fuel ratio on the basis of the signal thus produced, wherein the improvement comprises detecting the opening degree of the air-flow control valve and interrupting the regulation of the air-to-fuel ratio during a condition in which the detected opening degree of the air-flow control valve is smaller than a predetermined value or, preferably the air-flow control valve is substantially fully closed. If desired, the improvement may further comprise detecting the engine temperature and resuming the regulation of the air-to-fuel ratio in response to a condition in which the detected engine temperature is increased beyond a predetermined level and/or reducing the spark advance for each of the engine cylinders in response to a condition in which the detected engine temperature is lower than a predetermined level. The spark advance may be reduced either by eliminating the vacuum spark advance in the ignition system or by reducing the centrifugal spark advance by predetermined degrees under the condition in which the detected engine temperature is lower than the predetermined level. The reduction of the spark advance is conducive to promoting the rise of the combustion temperature of the engine and accordingly the rise of the exhaust temperature and may therefore be effected independently of the interruption of the regulation of the air-to-fuel ratio in an internal combustion engine having an ignition system including a vacuum advance mechanism responsive to the intake manifold vacuum and a centrifugal advance mechanism responsive to the revolution speed of the engine crankshaft.

In accordance with another important aspect of the present invention, there is provided an internal combustion engine which comprises a mixture supply system for producing a mixture of air and fuel to be delivered into the engine cylinders, an air-flow control valve for reducing the flow of air into the mixture supply system under low-temperature operating condition of the engine, an exhaust system having incorporated therein a catalytic converter which is reactive to at least one type of air-contaminative compound contained in the exhaust gases passed through the exhaust system and which is capable of producing a maximum conversion efficiency against the exhaust gases resulting from a mixture having a predetermined air-to-fuel ratio, an exhaust sensor for detecting the concentration of at least one type of chemical component in the exhaust gases passed through the exhaust system and producing a signal representative of the detected concentration of the chemical component and control means responsive to the output signal of the exhaust sensor for regulating the air-to-fuel ratio of the mixture to be produced in the mixture control system toward the above-mentioned predetermined air-to-fuel ratio on the basis of the aforesaid signal, wherein the improvement comprises tripping means responsive to the movement of the air-flow control valve and operative to temporarily disable the control means from functioning when the opening degree of the air-flow control valve is smaller than a predetermined value. The tripping means may comprise switch means electrically connected between the above-mentioned control means and a power source and having a first position to hold the control means operative and a second position to hold the control means inoperative, and detecting means responsive to the movement of the air-flow control valve for holding the switch means in the first position thereof when the opening degree of the air-flow control valve is larger than the aforesaid predetermined value and actuating the switch means into the second position thereof when the opening degree of the air-flow control valve is smaller than the predetermined value. An an alternative, the tripping means may comprise first and second switch means connected in parallel between the control means and a power source and each having a first position to hold the control means operative and a second position to hold the control means inoperative, first detecting means responsive to the movement of the air-flow control valve for holding the first switch means in the first position thereof when the opening degree of the air-flow control valve is larger than the aforesaid predetermined value and actuating the first switch means into the second position thereof when the opening degree of the air-flow control valve is smaller than the predetermined value, second detecting means for detecting engine temperature and producing an output signal representative of the detected engine temperature, and a control circuit electrically connected between the second switch means and the second detecting means for holding the second switch means in the first position thereof when the output signal of the second detecting means is indicative of an engine temperature higher than a predetermined level and actuating the second switch means into the second position thereof when the output signal of the second detecting means is indicative of an engine temperature lower than the predetermined level.

In combination with the improvement described above or independently of such improvement, an internal combustion engine according to the present invention may comprise detecting means for detecting engine temperature and producing an output signal representative of the detected engine temperature and an ignition system including a spark advance arrangement operative to produce normal spark advance when the output signal of the detecting means is indicative of an engine temperature higher than a predetermined level and reduced spark advance when the output signal of the detecting means is lower than the predetermined temperature. In this instance, the engine may further comprise a control circuit responsive to the output signal of the detecting means for producing an output signal when the signal from the detecting means is indicative of an engine temperature lower than the predetermined level, and ignition timing retarding means connected to the control circuit for producing the reduced spark advance in response to the output signal delivered from the control circuit. The spark advance arrangement for use with the retarding means may comprise a vacuum advance mechanism operative to produce vacuum spark advance responsive to the vacuum developed in the engine intake manifold through a vacuum passageway interconnecting the mechanism and the intake manifold, wherein the vacuum advance mechanism is disabled from producing the vacuum spark advance in the presence of the output signal from the control circuit. As an alternative to the retarding means of the above described nature, the ignition system may comprise an ignition coil and a contact set assembly consisting of first and second breaker units electrically connected in parallel to the ignition coil across a control circuit responsive to the output signal of the aforesaid detecting means, wherein the spark advance mechanism comprises a first centrifugal advance mechanism associated with the first breaker unit and operative to produce normal centrifugal spark advance responsive to engine output speed and a second centrifugal advance mechanism associated with the second breaker unit and operative to produce centrifugal advance which is smaller than the normal spark advance produced by the first centrifugal advance mechanism. In this instance, the control circuit operates in response to the output signal of the detecting means in such a manner as to be in a condition to provide connection between the ignition coil and the first breaker unit when the signal from the detecting means is indicative of an engine temperature higher than the aforesaid predetermined level and in a condition to provide connection between the ignition coil and the second breaker unit when the signal from the detecting means is indicative of an engine temperature which is lower than the predetermined level.

BRIEF DESCRIPTION OF THE DRAWING

The features and advantages of the method and the internal combustion engine according to the present invention will be understood more clearly from the following description taken in conjunction with the accompanying drawings in which like reference numerals designate corresponding parts in some figures and in which.

DESCRIPTION OF THE PREFERRED EMBODIMENTS

While each of the embodiments of the present invention will be described as being applied to an automotive internal combustion engine of the type using a carburetor as the mixture supply system by way of example, the gist of the present invention is applicable not only to such a type of engine but to an internal combustion engine of the fuel injection type.

Figure 1:
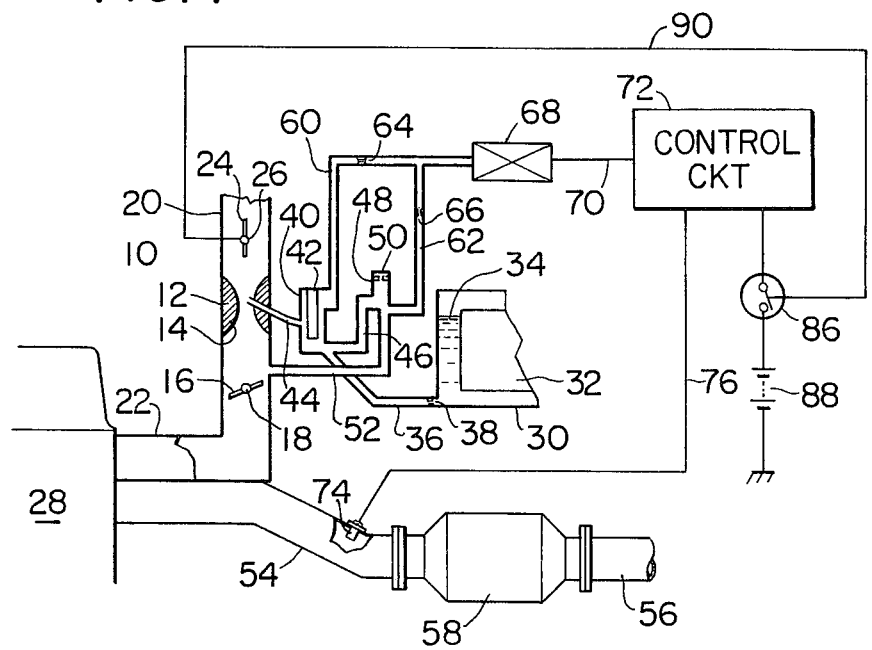
FIG. 1 is a schematic view showing, partly in section, a first preferred embodiment of an internal combustion engine according to the present invention.

Reference will now be made to the drawings, first to FIG. 1 which shows a first embodiment of the internal combustion engine according to the present invention, wherein the engine is assumed, by way of example, to be of the type using a carburetor 10 as the mixture supply system of the engine. The carburetor 10 includes a mixture delivery pipe 12 having a venturi 14 and a throttle valve 16 located downstream of the venturi 14 and rotatable with a throttle valve shaft 18. Though not shown, the throttle valve shaft 18 is connected to the accelerator pedal by a suitable mechanical linkage so that the throttle valve 16 is driven to rotate with the valve shaft 18 between fully open and fully closed positions through a part throttle position as the accelerator pedal is depressed or released. The mixture delivery pipe 12 intervenes between an air horn 20 upstream of the venturi 14 and an intake manifold 22 downstream of the throttle valve 16. The air horn 20 is vented from the open air through an air cleaner (not shown) and is arranged with a choke valve 24 which is rotatable with a choke valve shaft 26. As is well known, the choke valve 24 is operative to hold the air horn closed during cranking of the engine at low temperatures and open the air horn when the engine is warmed up and started. The choke valve 24 may be either of the type manually operated from the driver's seat or of the type automatically actuated in response to change in the engine temperature and/or by the vacuum developed in the intake manifold 22. The intake manifold 22 leads to engine cylinders (not shown) formed in a cylinder block 28.

The carburetor 10 further includes a main fuel delivery circuit which terminates in a carburetor float bowl 30 having a float 32 positioned therewithin. Though not shown, the float bowl 30 is in communication with a fuel storage tank through a flow control valve operated by the float 32 and has constantly stored therein liquid fuel pumped from the tank. The main fuel delivery circuit comprises a fuel feed passageway 36 leading from the bottom of the float bowl 30 through a fuel metering jet 38. The fuel feed passageway 36 terminates in a main fuel well 40 having a perforated atomizer tube (not numbered) which is vented from the open air through an air bleed 42. A main fuel discharge nozzle 44 leads from the fuel well 40 and opens into the venturi 14 in the mixture delivery pipe 12. The liquid fuel 34 in the float bowl 30 is thus drawn into the venturi 14 through the fuel feed passageway 36, main fuel well 40 and main fuel discharge nozzle 44 by the suction established in the venturi 14 when the engine is in operation with the throttle valve 16 in the fully open position or in a part throttle position thereof. The air-to-fuel ratio of the mixture thus produced in the mixture delivery pipe 12 is dictated by the rate at which air is passed through the venturi 14 and the rate at which fuel is discharged into the venturi 14. As will be described later, the fuel discharged from the main fuel discharged from the main fuel discharge nozzle 44 is a premix of air and fuel in an emulsified state. The air-to-fuel ratio of the mixture produced in the mixture delivery pipe 12 is, for this reason, determined not only by the rates at which air and fuel are supplied to the mixture delivery pipe 12 but, exactly, by the air-to-fuel ratio of the fuel emulsion discharged from the main fuel discharge nozzle 44.

The carburetor 10 further includes, in addition to the main fuel delivery circuit above described, a low-speed fuel delivery circuit which is arranged to deliver fuel in an emulsified state into the mixture delivery pipe 12 downstream of the throttle valve 16 when the throttle valve 16 is fully closed during idling or low-speed operation of the engine. The low-speed fuel delivery circuit comprises a low-speed fuel feed passageway 46 branched from the main fuel feed passageway 36. The low-speed fuel feed passageway 46 leads to a low-speed fuel well 48 vented from the open air through an air bleed 51. The low-speed fuel well 48 in turn is in communication with a low-speed fuel discharge passageway 52 having a terminal end open into the mixture delivery pipe 12 in proximity to an edge portion of the throttle valve 16 in the fully closed position thereof. Though not shown, the low-speed fuel discharge passageway 52 is branched into an idle fuel discharge passageway open into the mixture delivery pipe 12 downstream of the outlet end of the low-speed fuel discharge passageway 52. The air bleeds 42 and 50 of the main and low-speed fuel wells 40 and 48 are usually in communication with the air cleaner either directly or through the air horn 20.

The above described arrangements of the main and low-speed fuel delivery circuits are merely for the purpose of illustration and are, thus, subject to modification and change.

The internal combustion engine further has an exhaust system which comprises an exhaust manifold 54 leading from the exhaust ports (not shown) of the engine cylinders and an exhaust pipe 56 leading from the exhaust manifold 54. The exhaust pipe 56 in turn leads through a muffler or mufflers to an exhaust tail pipe which is open to the atmosphere at its terminal end, though not shown.

The exhaust system is arranged with a catalytic converter 58 which is shown mounted on the exhaust pipe 56 downstream of the exhaust manifold 54. If desired, however, the catalytic converter 58 may be mounted on a converged tube portion of the exhaust manifold 54 upstream of the exhaust pipe 56. The term converged tube portion herein used refers to that portion of an exhaust manifold which extends downstream from the branched tube portions respectively communicating with the exhaust ports of the individual engine cylinders. Furthermore, the catalytic converter 58 is assumed to be of the previously mentioned tripple-effect of "three-way" type which is concurrently reactive to the three different types of air contaminative compounds, viz., hydrocarbons, carbon monoxide and nitric oxides contained in the exhaust gases from the engine cylinders.

As discussed previously, a tripple-effect catalytic converter exhibits its maximum conversion efficiency against the three types of air contaminative compounds when the air-fuel mixture supplied to the engine cylinders is proportioned to a stoichiometric ratio of approximately 14.8:1 or within a certain range containing such a ratio. To achieve this end in the internal combustion engine shown in FIG. 1, the main and low-speed fuel delivery circuits of the carburetor 10 are provided with main and low-speed air-bleed passageways 60 and 62, respectively, which are in communication through restrictions or orifices 64 and 66 with a solenoid-operated air-bleed control valve unit 68. The valve unit 68 is of a two-position type having a first position providing communication between the open air and each of the air-bleed passageways 60 and 62 and a second position blocking such communication. For convenience of description, the valve unit 68 is actuated into the first position when energized and is brought into the second position when de-energized. When, thus, the valve unit 68 is energized, the main and low-speed air-bleed passageways 60 and 62 are vented from the open air through the valve unit so that the liquid fuel entering each of the main and low-speed fuel wells 40 and 48 is mixed with not only the air entering the well through each of the air bleeds 42 and 50 but the air which is passed through the valve unit 68 and each of the air-bleed passageways 60 and 62 into each well. When, however, the valve unit 68 is de-energized and brought into the second position thereof, both of the main and low-speed air-bleed passageways 60 and 62 are isolated from the open air so that the liquid fuel admitted into each of the main and low-speed fuel wells 40 and 48 is mixed only with the air entering the well through each of the air bleeds 42 and 50. A leaner air-fuel mixture is thus produced in the mixture delivery pipe 12 during the condition in which the valve unit 68 is in the first position than during the condition in which the valve unit 68 is in the second position thereof. The air-to-fuel ratio of the mixture produced in the mixture delivery pipe 12 can therefore be varied by varying the frequency at which the valve unit 68 is actuated between the first and second positions thereof and the individual durations in which the valve unit 68 is held in the first and second positions. If, thus, the solenoid-operated valve unit 68 is controlled appropriately, then the air-to-fuel ratio of the mixture produced in the mixture delivery pipe 12 will be propertioned toward a stoichiometric level. For this purpose, the valve unit 68 is electrically connected by a line 70 to an electric control circuit 72 which operates on a basic signal fed back from the exhaust system by an exhaust sensor 74 connected to the control circuit by a line 76.

The exhaust sensor 74 is located in the exhaust system upstream of the catalytic converter 58 and is operative to monitor the air-to-fuel ratio of the mixture produced in the carburetor 10 from the concentration of at least one prescribed type of chemical component contained in the exhaust gases passed therethrough. The exhaust sensor 74 is, by way of example, shown to be located in the exhaust manifold 54 (or, more exactly, in the converged tube portion of the exhaust manifold) but, if desired, may be located in the exhaust pipe 56 preferably upstream of the catalytic converter 58. If the catalytic converter 58 is mounted on the converged tube portion of the exhaust manifold 54, the exhaust sensor 74 is preferably also located in the particular portion of the exhaust manifold 54 but upstream of the catalytic converter 58 thus arranged. The exhaust sensor 74 herein shown is, furthermore, assumed also by way of example to be of the type adapted to detect the concentration of oxygen contained in the exhaust gases passed therethrough. If desired, however, the exhaust sensor 74 may be of the type sensitive to any other chemical component of the exhaust gases such as hydrocarbons, carbon monoxide, carbon dioxide, nitric oxides or any combination of two or more of these and/or oxygen.

In operation, the exhaust sensor 74 detects the concentration of oxygen contained in the exhaust gases passed through the sensor and produces an analog output signal So indicative of the detected concentration of oxygen. The output signal So of the exhaust sensor 74 is usually in the form of voltage that varies continuously with the concentration of oxygen in the exhaust gases to which the sensor is subjected. In the case of an exhaust sensor using an electrolytic element coated with microporous layers of platinum, the output voltage of the sensor is usually in the vicinity of 400 milli-volts when the air-fuel mixture combusted in the engine cylinders is proportioned to the stoichiometric ratio of about 14.8:1. The output voltage of the sensor drops and rises abruptly as the air-to-fuel ratio of the mixture supplied to the engine cylinders increases and decreases, respectively, from the stoichiometric level.

The control circuit 72 thus supplied with the output signal So from the exhaust sensor 74 produces a control signal Sc which is preferably in the form of a train of pulses having a frequency and pulsewidths varying with the initial signal So impressed on the control circuit 72. The control signal Sc is fed to the solenoid-operated two-position valve unit 68 and actuates the valve unit between the previously mentioned first and second positions thereof at a frequency and for durations which are dictated by the frequency and pulsewidths of the pulses forming the control signal Sc applied to the valve unit 68. In the shown embodiment in which the catalytic converter 58 is assumed to be of the tripple-effect type, the control circuit 72 is assumed to be arranged to cause the valve unit 68 to open and close at such a frequency and for such durations that will allow atmospheric air through the valve unit 68 into each of the air-bleed passageways 60 and 62 of the main and low-speed fuel delivery circuits at such a rate that will produce in the mixture delivery pipe 12 an air-fuel mixture having an air-to-fuel ratio approximating the stoichiometric level. The control circuit of this nature may be readily designed by those skilled in the art, an example of such a circuit being illustrated in FIG. 2.

Figure 2:
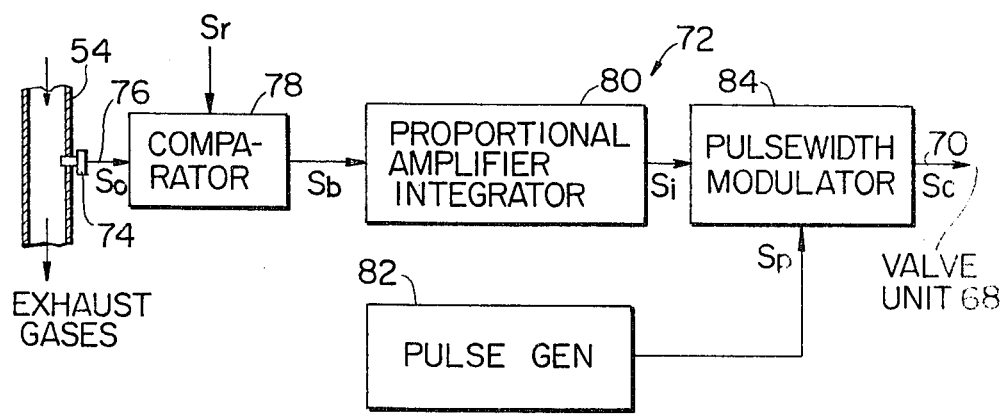
FIG. 2 is a block diagram which shows a preferred example of the electrical arrangement of a control circuit incorporated into the embodiment illustrated in FIG. 1.

Referring to FIG. 2, the control circuit 68 comprises a comparator 78, a combination proportional amplifier and integrator 80, a saw-tooth or triangular pulse generator 82 and a pulsewidth modulator 84. The comparator 78 has a first input terminal connected to the output terminal of the above-mentioned exhaust sensor 74 by the line 76 and a second input terminal on which a reference signal Sr is constantly impressed. The reference signal Sr is given as a fixed voltage representative of the concentration of oxygen in the exhaust gases resulting from a stoichiometric air-fuel mixture. The reference signal Sr is, thus, herein assumed, by way of example, to be given as the voltage of about 400 milli-volts for the reason previously explained.

The comparator 78 is operative to compare the output signal So with the reference signal Sr and produces a binary output signal Sb which assumes a logic "0" value when the voltage of the signal So is higher than 400 milli-volts of the reference signal Sr (viz., when the air-fuel mixture supplied to the engine cylinders is richer than a stoichiometric mixture) and a logic "1" value when the former is lower than the latter (viz., when the mixture supplied to the cylinders is leaner than a stoichiometric mixture). The binary signal Sb thus produced by the comparator 80 is fed to the combination proportional amplifier and integrator 82 which is arranged to produce a linear ramp signal Si which increases or decreases in response to the input signal Sb of the logic "0" or "1" value, respectively. On the other hand, the saw-tooth or triangular pulse generator 84 is operative to produce a train of saw-tooth or triangular pulses Sp having equal pulsewidths and a predetermined constant frequency. The ramp signal Si from the combination proportional amplifier and integrator 82 and the train of saw-tooth or triangular pulses Sp from the pulse generator 84 are fed to the pulsewidth modulator 86. The pulsewidth modulator 86 is, in effect, a comparator and is thus operative to compare the ramp signal Si with the saw-tooth or triangular pulses Sp, thereby producing a train of square-shaped pulses having positive durations when the signal Si is lower in magnitude than the saw-tooth or triangular pulses Sp. The train of the square-shaped pulses produced in this fashion by the pulsewidth modulator 86 provides the previously mentioned control signal Sc and is delivered from the control circuit 72 to the solenoid-operated valve unit 68, which is consequently controlled to open and close at intervals dictated by the pulses Sc which are fed in succession to the valve unit 68 through the line 70.

In a prior art mixture control system of the nature thus far described, the control circuit 72 and accordingly the valve unit 68 are maintained operative throughout the operation of the engine without respect to variation in the operating conditions of the engine. When, therefore, the engine is being cranked with the choke valve 24 fully closed, the control circuit 72 controls the valve unit 68 to open for increased durations to compensate for the reduction of air flow through the air horn 20 in an attempt to produce in the mixture delivery pipe 12 an air-fuel mixture approximating a stoichiometric mixture. The engine cylinders are therefore supplied with an air-fuel mixture which is leaner than required under cranking condition at low temperatures and fail to operate properly. This causes the engine to retard in starting and emit increased quantities of toxic air contaminative compounds.

To prevent this from occurring, the mixture control system of the embodiment shown in FIG. 1 is provided with tripping means operative to hold the control circuit 72 inoperative during cranking of the engine irrespective of the signal So supplied from the exhaust sensor 74. The tripping means comprises a switch 86 connected between a power source 88 for the control circuit 72 and the power input terminal of the control circuit as shown or, though not shown, between the power source 88 and the ground. The switch 86 is connected by a suitable mechanical linkage 90 to the choke valve 24 so that the switch 86 is open when the choke valve 24 is closed or partially open and is closed when the choke valve 24 is fully open. Alternatively, the switch 86 may be arranged so as to be open when the opening degree of the choke valve 24 is smaller than a predetermined value and to close when the opening degree of the choke valve 24 is larger than such a value, if desired.

When, thus, the choke valve 24 is fully closed or held in a position providing an opening degree larger than a predetermined value in the air horn 20, the switch 86 is kept closed and maintains the control circuit 74 energized from the power source 88. The control circuit 86 is therefore operative to control the solenoid-operated air-bleed control valve unit 68 in such a manner that the air-to-fuel ratio of the mixture produced in the mixture delivery pipe 12 is constantly regulated toward a stoichiometric ratio of about 14.8:1. When, however, the choke valve 24 is closed or partially open or held in a position providing an opening degree smaller than the above-mentioned predetermined value during cranking of the engine at low temperature, the switch 86 is kept open and maintains the control circuit 74 de-energized. The control circuit 74 is therefore disabled from controlling the valve unit 68 in the above described fashion so that the valve unit 68 is maintained in the previously mentioned second position thereof isolating the air-bleed passageways 60 and 62 from the open air. Less than normal quantities of air are thus admixed to the liquid fuel in the main and low-speed fuel delivery circuits of the carburetor 10. When, furthermore, the choke valve 24 is closed or partially open, the vacuum developed in the intake manifold 22 of the engine extends far into the venturi 14 past the throttle valve 16 in the mixture delivery pipe 12 and acts to suck fuel from the main fuel discharge nozzle 44 into the venturi 14 as well as from the low-speed fuel discharge passageway 52. The air-fuel mixture produced in the mixture delivery pipe 12 is therefore made richer than a stoichiometric ratio by the combined effects of enrichment of the fuel premix delivered into the mixture delivery pipe 12, reduction of the air flow through the air horn 20 and increased quantities of fuel injected into the mixture delivery pipe 12. When the engine is warmed up and is started in stable condition, the choke valve 24 is fully opened either manually or automatically so that the switch 86 is caused to close and energizes the control circuit 74 from the power source 88. The control circuit 74 is therefore initiated into operation to control the valve unit 68 in such a manner as to regulate the air-to-fuel ratio of the mixture produced in the mixture delivery pipe 12 toward a stoichiometric ratio as previously described and enables the catalytic converter 58 to produce its maximum conversion efficiency.

Figure 3:
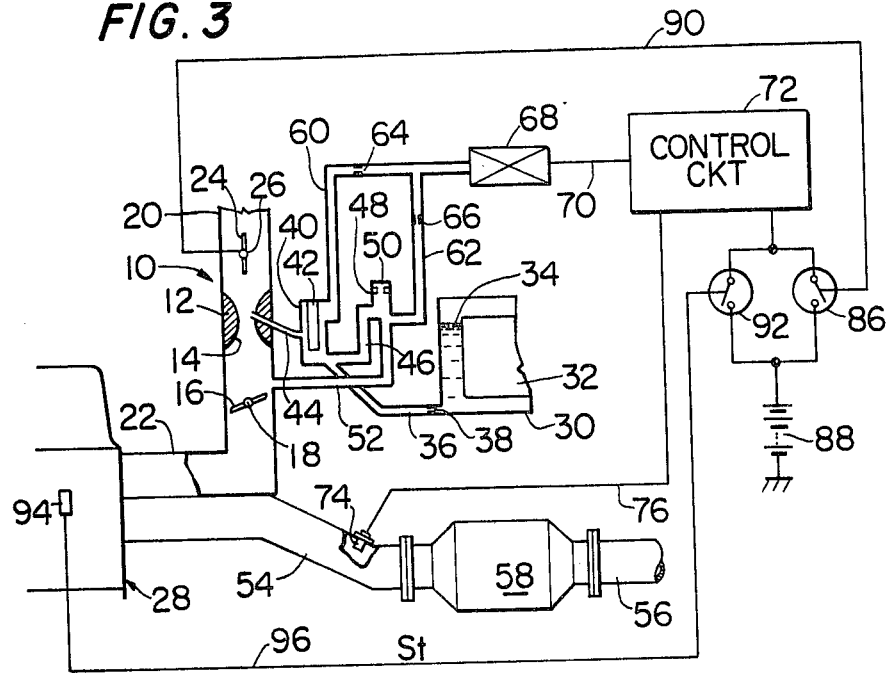
FIG. 3 is a view similar to FIG. 1 but shows a second preferred embodiment of the internal combustion engine according to the present invention.

If the choke valve 24 is of the manually operated type, it may happen that the operator of the vehicle inadvertently leaves the choke valve 24 closed or partially open until he starts the vehicle although the engine has already been warmed up. FIG. 3 shows an embodiment in which the tripping means for the control circuit 74 is modified to prevent this from occurring. The embodiment of FIG. 3 is entirely similar to that of FIG. 1 except for the arrangement of the tripping means and, thus, the description regarding the internal combustion engine per se, the catalytic converter, and the mixture control system including the valve unit 68, control circuit 72 and exhaust sensor 74 of the embodiment illustrated in FIG. 1 applies, without change, to those of the embodiment of FIG. 3.

Referring to FIG. 3, the tripping means for the control circuit 72 of the mixture control system comprises an engine temperature switch 92 in addition to a choke switch 86. The choke switch 86 is, in itself, similarly arranged to its counterpart in the embodiment of FIG. 1 and is, thus, driven to open and close by the choke valve 24 in the air horn 20 through a mechanical linkage 90. The choke and engine temperature switches 86 and 92 are connected in parallel between a power source 88 and the power input terminal of the control circuit 72 as shown. If desired, the parallel combination of the switches 86 and 92 may be connected between the negative terminal of the power source 88 and ground, though not shown. An engine temperature sensor 94 is located in the water jacket of the cooling system of the engine so as to detect the engine temperature from the temperature of the cooling water circulated through the water jacket. The engine temperature sensor 94 thus produces an electrical output signal St indicative of the detected engine temperature and delivers the signal St to the engine temperature switch 92 through a line 96 electrically interconnecting the switch 92 and the sensor 94. The engine temperature switch 92 is arranged to be open when the signal St is of a magnitude indicative of an engine temperature lower than a predetermined level and to close if the magnitude of the signal St is indicative of an engine temperature higher than such the predetermined level. Both of the choke and engine temperature switches 86 and 92 are open during cranking of the engine at a low temperature so that the control circuit 72 is disconnected from the power source 88 and is accordingly tripped. As the engine temperature rises and reaches the above-mentioned predetermined level, the engine temperature switch 92 is caused to close and makes the control circuit 72 energized from the power source 88 even though the choke switch 86 may be left open. The mixture control system is in this fashion put into operation irrespective of the position of the choke valve 24 as soon as the engine is warmed up to the predetermined temperature. If the choke valve 24 is moved to fully open before the predetermined temperature is reached in the engine, the choke switch 86 is caused to close and makes the control circuit 72 operative with the engine temperature switch 92 kept open.

In each of the embodiments illustrated in FIGS. 1 and 3, the choke switch 86 has been described as being mechanically connected to the choke valve 24, the switch 86 may be controlled to open and close by an electrical signal indicative of the condition of the choke valve 24. It is, furthermore, apparent that the embodiment of FIG. 3 is adapted for use especially in an internal combustion engine using a manually operated choke valve, the tripping means incorporated in the embodiment may be used in an internal combustion engine using an automatically controlled choke valve.

The performance characteristics of the exhaust sensor 74 used in the feedback mixture control system of the nature herein described is affected by the temperature of the exhaust gases to which the sensor is subjected during operation, as previously noted. If the temperature of the exhaust gases passed through the exhaust sensor 74 is maintained at a low level, the exhaust sensor is disabled from producing a reliable output signal and causes the mixture control system to fail to properly control the air-to-fuel ratio of the mixture produced in the mixture delivery pipe 12. If, therefore, the temperature of the exhaust gases remains lower than a certain level enabling the exhaust sensor 74 to operate properly when the mixture control system is put into play after cranking of the engine, the catalytic converter 58 in the exhaust system is unable to produce its maximum conversion efficiency and, as a consequence, the exhaust cleaning performance of the engine will be critically impaired. Such a problem will be also encountered in an internal combustion engine using a prior art feedback mixture control system which is put into play during cranking of the engine, because the mixture control system is disabled from operating properly due to the unreliableness of the output signal delivered from the exhaust sensor. During cranking of an engine, this problem is especially serious because more than normal quantities of unburned hydrocarbons and carbon monoxide are contained in the exhaust gases.

Figure 5:
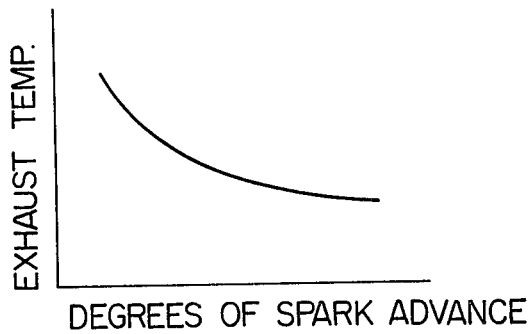
FIG. 5 is a graph which represents a general tendency of the relationship between the spark advance in terms of engine crankshaft rotation degrees and the temperature of exhaust gases as observed in usual internal combustion engines.

As is well known in the art, the combustion temperature of an internal combustion engine and accordingly the temperature of the exhaust gases emitted from the engine are closely related to the ignition timings of the engine. FIG. 5 illustrates a curve which indicates a general tendency of the relationship between the degrees of spark advance (taken on the axis of abscissa) and the temperature of exhaust gases (taken on the axis of cordinate). From this curve, it is clearly seen that the exhaust temperature becomes the higher as the degrees of spark advance are made smaller or, in other words, the ignition timings are retarded. This means that the exhaust sensor 74 and accordingly feedback mixture control system as a whole are enabled to properly function as soon as or at an early stage after the engine has been cranked if the degrees of spark advance of the engine are reduced until the exhaust temperature reaches a certain level that will enable the exhaust sensor to produce a reliable output signal. Such a concept can be realized not only in an internal combustion engine having a feedback mixture control system arranged with the tripping means of the nature described with reference to FIG. 1 or 3 but in an internal combustion engine using a prior art feedback mixture control system to be in operation during cranking of the engine. In the description to follow, therefore, the arrangement adapted to realize the above-mentioned basic concept will be described as being made in combination with a prior art feedback mixture control system which is void of the tripping means responsive to cranking and/or low-temperature conditions of the engine.

Figure 4:
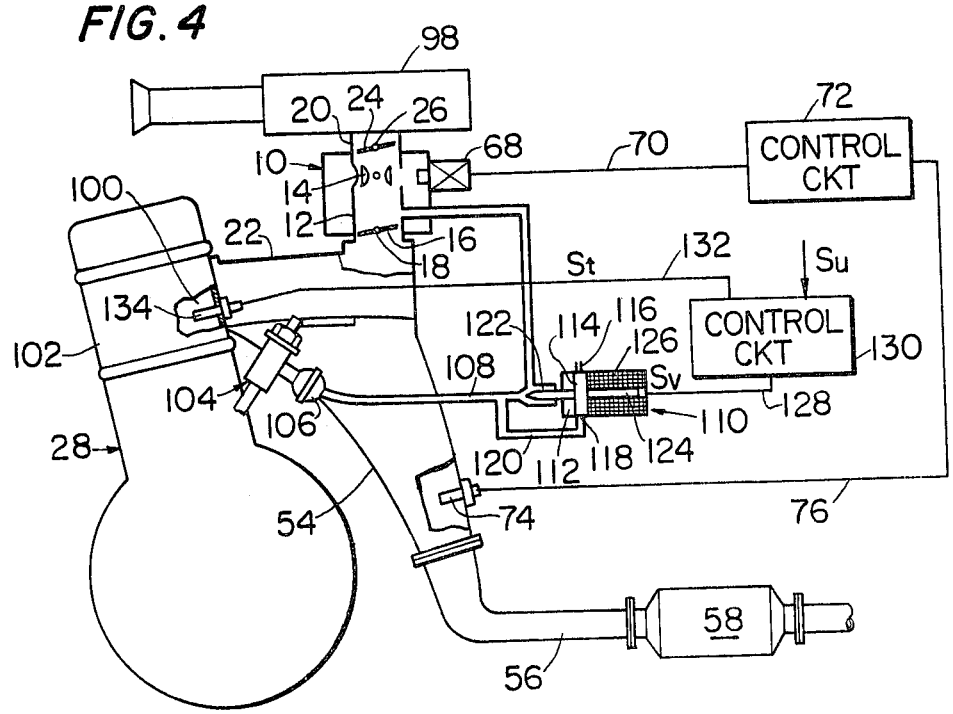
FIG. 4 is a schematic view showing, partly in section, a third preferred embodiment of the internal combustion engine according to the present invention.

Referring to FIG. 4, an internal combustion engine is shown to be of the type essentially similar to those of FIGS. 1 and 3 and thus comprises a carburetor 10 as the mixture supply system of the engine. The members and units of the carburetor 10 which are similar to those shown in FIGS. 1 and 3 are designated by like reference numerals. Designated by 98 is an air cleaner connected to the air horn 20 and by 100 is a portion of a passageway of cooling water for the engine cylinders. The passageway portion 100 may be a portion of the water jacket cast into the cylinder head which is designated by reference numeral 102. In addition to the parts and units illustrated, the carburetor 10 includes fuel delivery circuits arranged similarly to those of the embodiment of FIGS. 1 and 3. The carburetor 10 is, furthermore, arranged with a catalytic converter 58 in the exhaust system, more specifically, in the exhaust pipe 56, and a feedback or open-loop mixture control system comprising a solenoid-operated air-bleed control valve unit 66, an electric control circuit 72 connected by line 70 to the valve unit 66, and an exhaust sensor 74. The valve unit 68, control circuit 72 and exhaust sensor 74 are all assumed to be arranged similarly to their counterparts in the embodiments of FIGS. 1 and 3.

Designated by reference numeral 104 is an ignition distributor having a vacuum advance mechanism including a diaphragm unit 106. Though not shown, the diaphragm unit 106 contains therein a spring-loaded, air-tight diaphragm connected by a linkage, or lever, to the breaker plate of the ignition distributor as is well known in the art. The diaphragm defines in the diaphragm unit 106 a hermetically sealed vacuum chamber (not shown) which is in constant communication through a vacuum conducting passageway 108 with the mixture delivery pipe 12 through a port located on the atmospheric side of the throttle valve 16 in the idling position as illustrated. When, thus, the throttle valve 16 is opened, the valve 16 swings past the inlet port of the vacuum conducting passageway 108 and allows the intake manifold vacuum to draw air from the passageway 108 and the vacuum chamber in the diaphragm unit 106. This causes the breaker plate of the vacuum advance mechanism to rotate so that the breaker cam, as it rotates, closes and opens the contact points earlier in each cycle of operation. As a consequence, the spark appears at each of the spark-plug gaps earlier in the compression stroke of each cycle. As the throttle valve 16 is opened wider, there will be the less vacuum in the intake manifold 22 and accordingly the degrees of vacuum advance are made the smaller. When, therefore, the throttle valve 16 is in the fully closed position, there is no vacuum developed in the mixture delivery pipe 12 upstream of the throttle valve 16 so that there is no vacuum advance obtained in the ignition distributor 104. The construction and operation of the vacuum advance mechanism of an ignition system is well known in the art and, therefore, no further description thereof will be herein incorporated.

In the embodiment of the present invention, the vacuum advance mechanism generally arranged as above described is provided with tripping means responsive to change in the engine temperature and operative to disable the vacuum advance mechanism from operating when the engine temperature is lower than a certain level. The tripping means comprises a solenoid-operated two-position valve unit 110 having a valve chamber 112 in which a spool valve element 114 is axially movable. The valve chamber 112 is formed with air inlet and outlet ports 116 and 118 which are aligned with each other in a direction perpendicular to the axis of the valve chamber 112. The air inlet port 116 is open to the atmosphere while the air outlet port 118 is in communication with an intermediate portion of the vacuum conducting passageway 108 through an air passageway 120. A plunger 122 axially extends from one end face of the spool valve element 114 and projects out of the valve chamber 112 into the vacuum conducting passageway 108 immediately upstream of the terminal end of the air passageway 120 as shown. The spool valve element 114 is axially movable in the valve chamber 112 between a first position closing the air inlet and outlet ports 116 and 118 and accordingly blocking communication between the ports 116 and 118 and a second position opening the air inlet and outlet ports 116 and 118 and thereby providing communication between the ports 116 and 118, viz., between the air passageway 122 and the open air. When the spool valve element 114 is in the above-mentioned first position closing the ports 116 and 118, the plunger 122 connected to the spool valve element 114 is held in a position providing communication between the ends of the vacuum conducting passageway 108. When, however, the spool valve element 114 is in the above-mentioned second position thereof opening the air inlet and outlet ports 116 and 118, the plunger 122 is held in a position closing the vacuum conducting passageway 108 immediately upstream of the terminal end of the air passageway 120 so that the vacuum conducting passageway 108 downstream of the terminal end of the air passageway 120 is vented from the open air through the air passageway 120 and the air inlet and outlet ports 116 and 118 of the valve chamber 112. The valve unit 110 further has a solenoid core 124 surrounded by a solenoid coil 126. The spool valve element 114 is assumed, by way of example, to be held in the first position thereof when the solenoid coil 126 is de-energized and is brought into the second position thereof when the solenoid coil 126 is energized. The solenoid coil 126 is connected by a line 128 to the output terminal of an electric control circuit 130. The input terminal of the control circuit 130 is connected by a line 132 to an engine temperature sensor 134 located in the previously mentioned passageway portion 100 for circulating the cooling water for the engine cylinders. The engine temperature sensor 134 is adapted to detect the engine temperature from the temperature of the cooling water circulated through the passageway portion 100 and produce an electric signal St indicative of the detected engine temperature. The signal St is supplied to the control circuit 130 which is operative to compare the magnitude of the signal St with a suitable reference signal Su indicative of a predetermined temperature level that will enable the exhaust sensor 74 to operate properly. The control circuit 130 thus delivers a continuous output signal Sv when the input signal St is smaller in magnitude than the reference signal Su, viz., the detected engine temperature is lower than the above-mentioned predetermined level. The control circuit 130 may be arranged to deliver the output signal Sv when the input signal St is indicative of a cooling water temperature lower than 60° C. by way of example.

When, now, the engine is operating in normal conditions at a temperature higher than the predetermined level which is indicated by the reference signal Su constantly impressed on the control circuit 130, the solenoid-operated valve unit 110 is maintained de-energized in the absence of the output signal Sv from the control circuit 130. The valve unit 110 is accordingly maintained in a condition in which the spool valve element 114 is held in the position closing the air inlet and outlet ports 116 and 118 of the valve chamber 112 and the plunger 122 is held in the position providing communication between the ends of the passageway 108. The air inlet and outlet ports 116 and 118 being closed by the spool valve element 114, the air passageway 120 is isolated from the open air. Under these conditions, the vacuum developed in the intake manifold 22 of the engine extends upstream beyond the throttle valve 16 in a part throttle or fully open position and draws air from the vacuum conducting passageway 108 and the valve chamber in the diaphragm unit 106 of the vacuum advance mechanism of the ignition distributor 104. The vacuum advance mechanism of the distributor 104 is therefore operative in normal condition, providing vacuum advance degrees that vary with the opening degree of the throttle valve 16.

When, however, the engine temperature as detected by the engine temperature sensor 134 is lower than the predetermined level represented by the reference signal Su, the control circuit 130 delivers the output signal Sv to the solenoid-operated valve unit 110. The valve unit 110 is now actuated into a condition having the spool valve element 114 moved past the air inlet and outlet ports 116 and 118 of the valve chamber 112 and the plunger 122 moved forward into the vacuum conducting passageway 108. As a consequence, the vacuum conducting passageway 108 is closed immediately upstream of the terminal end of the air passageway 120 which is now vented from the open air through the air inlet and outlet ports 116 and 118 of the valve chamber 112. The vacuum communication between the ends of the vacuum conducting passageway 108 is thus blocked immediately upstream of the terminal end of the air passageway 120 by the plunger 122 of the valve unit 110 so that atmospheric air is admitted through the air inlet and outlet ports 116 and 118 and the air passageway 120 into the vacuum conducting passageway 108 downstream of the plunger 122 and, through the passageway 108, into the vacuum chamber in the diaphragm unit 106 of the vacuum advance mechanism of the ignition distributor 104. An atmospheric pressure is consequently developed in the vacuum chamber of the diaphragm unit 106 and disables the vacuum advance mechanism from producing vacuum advance. There being no vacuum advance, the ignition timings are advanced solely by the mechanical or centrifugal advance mechanism incorporated in the ignition distributor 104 so that the spark advance degrees are reduced by the amounts corresponding to the vacuum advance degrees normally added to the centrifugal advance degrees. The more the ignition timings are thus retarded, the higher the combustion temperature of the engine and accordingly the exhaust temperature become as will be understood from the curve of FIG. 4 and, as a consequence, the exhaust temperature reaches the earlier the predetermined level that will enable the exhaust sensor 74 to operate properly and reliably. When the engine is sufficiently warmed up so that the engine temperature as detected by the sensor 134 reaches the level prescribed by the reference signal Su impressed on the control circuit 130, the control circuit 130 ceases the delivery of the output signal Sv and renders the valve unit 110 inoperative. Vacuum is now developed in the vacuum chamber of the diaphragm unit 106 and the vacuum advance mechanism in the ignition distributor 104 is put into play as usual.

Figure 6:
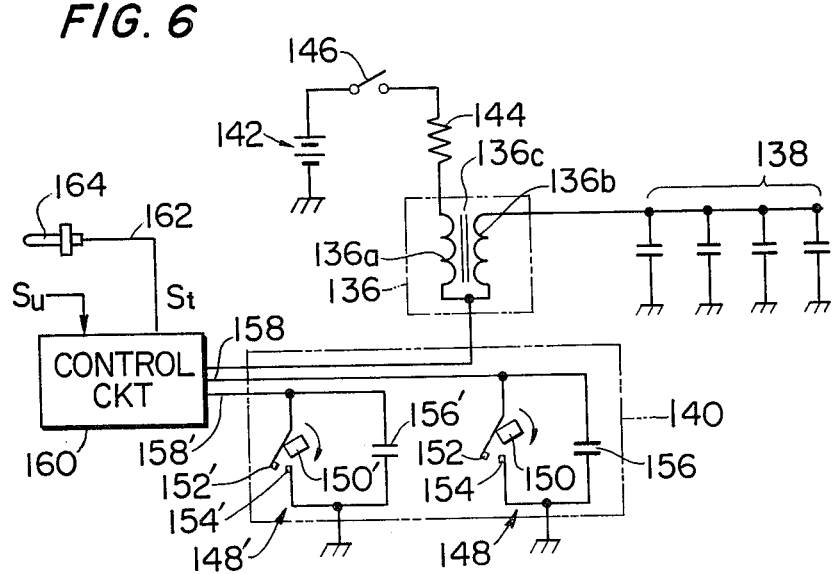
FIG. 6 is a schematic view showing part of an electrical arrangement of an ignition system of a fourth preferred embodiment of the internal combustion engine according to the present invention.

While the retardation of the ignition timings is produced by disabling the vacuum advance mechanism in the embodiment above described, substantially similar results may be achieved through modification of the mechanical or centrifugal advance mechanism of the ignition system. FIG. 6 illustrates an ignition system of an embodiment of the present invention to realize such a concept.

Referring to FIG. 6, an ignition system of an internal combustion engine is shown comprising an ignition coil 136 consisting of primary and secondary windings 136a and 136b and a core 136c, a set of spark plugs 138, and a contact set assembly 140. The primary winding 136a of the ignition coil 136 is connected at one end to a d.c. power source 142 through a resistor 144 and an ignition switch 146 and the secondary winding 136b is connected at one end to the electrode in the distributor cap (not shown) for sequential connection to the spark plugs 138, as is well known in the art.

Figure 7:
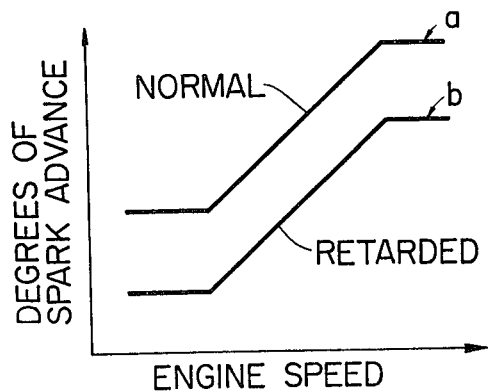
FIG. 7 is a graph showing the normal and retarded spark advance schedules which are achieved in the ignition system of FIG. 6 as the engine speed is varied.

In the embodiment of the present invention shown in FIG. 6, the contact set assembly 140 comprises first and second breaker units 148 and 148' each of which is, in itself, constructed similarly to usual contact set assemblies. The first and second breaker units 148 and 148' respectively comprise breaker cams 150 and 150', breaker plates (not shown) with contact points 152 and 154 for the first breaker unit 148 and contact points 152' and 154' for the second breaker unit 148', and condensers 156 and 156'. The breaker cams 150 and 150' may be mounted on a common shaft or on shafts respectively proper to the cams and are driven for rotation from the engine crankshaft through the shaft or shafts. Though not shown, the first and second breaker units 148 and 148' further comprise centrifugal advance mechanism which are respectively proper thereto. The centrifugal advance mechanism of the first breaker unit 148 is arranged to provide normal spark advance schedules responsive to the revolution speed of the engine crankshaft, while the centrifugal advance mechanism of the second breaker unit 148' is conditioned to produce spark advance degrees which are smaller by predetermined degrees than those produced by the centrifugal advance mechanism of the first breaker unit 148. FIG. 7 illustrates curves indicating an example of the general relationship between the centrifugal spark advance degrees produced by the two mechanisms in terms of the engine speed, wherein curve *a* shows the normal spark advance produced by the first breaker unit 148 and curve *b* shows the reduced or retarded spark advance achieved by the second breaker unit 148'.

The first and second breaker units 148 and 148' are electrically connected by lines 158 and 158', respectively, to the other terminal of the primary winding 136a of the ignition coil 136 through a control circuit 160. The control circuit 160 has incorporated therein a two-position switching arrangement (not shown) for selectively providing connection between the ignition coil 136 and the line 158 leading from the first breaker unit 148 and connection between the ignition coil 136 and the line 158' leading from the second breaker unit 148'. The control circuit 160 is connected by a line 162 to an engine temperature sensor 164. The sensor 164 is located anywhere in the water circulating passageway (not shown) of the cooling system of the engine and detects the engine temperature from the temperature of the cooling water circulated through the passageway. The engine temperature sensor 164 thus delivers a signal St representative of the detected engine temperature to the control circuit 160 through the line 162. The control circuit 160 is operative to compare the signal St with a suitable reference signal Su indicative of a predetermined temperature level that will enable the exhaust sensor of the previously described nature to properly operate. When the signal St indicative of the detected engine temperature is greater in magnitude than the reference signal Su or, in other words, the engine is sufficiently warmed up so that the exhaust sensor is enabled to operate properly, then the control circuit 160 is conditioned to provide connection between the ignition coil 136 and the first breaker unit 148 through the line 158. When, however, the signal St is smaller in magnitude than the reference signal Su, viz., the engine temperature is lower than the predetermined level that will enable the exhaust sensor to operate properly, then the control circuit 160 is conditioned to provide connection between the ignition coil 136 and the second breaker unit 148' through the line 158'.

When the primary winding 136a of the ignition coil 136 is thus connected to the first breaker unit 148 through the control circuit 160 and the line 158, the spark plugs 138 are energized at timings dictated by the normal centrifugal advance schedules of the first breaker unit 148 so that the engine is operated under usual conditions. When, however, the engine temperature is so low that the exhaust sensor provided in the exhaust system is not properly operable, the primary winding 136a of the ignition coil 136 is connected to the second breaker unit 148' through the control circuit 160 and the line 158' as above described so that the ignition timings are dictated by the retarded centrifugal advance schedules of the second breaker unit 148'. The ignition timings being thus retarded, the combustion temperature in the engine cylinders is raised and reaches the above-mentioned predetermined level in a shortened period of time, enabling the exhaust sensor to operate properly at an early stage after the engine is cranked or started upon cranking. FIG. 7 shows examples of the normal spark advance schedules (indicated by curve *a*) dictated by the first centrifugal advance mechanism and the reduced or retarded spark advance schedules (indicated by curve *b*) dictated by the second centrifugal advance mechanism.

If desired, the engine temperature may be detected not from the engine cooling water but from the exhaust gases discharged from the engine cylinders or one of the cylinders in each of the embodiments shown in FIGS. 3, 4 and 6.

While, furthermore, the internal combustion engine in each of the embodiments herein described has been of the type using a carburetor as the mixture supply system, it is apparent that the present invention can be embodied also in an internal combustion engine of using a mixture supply system of the fuel injection type. In this instance, the valve unit to control the flow or flows of fuel into the mixture supply system may be constructed as part of each of the fuel injection valves associated with the individual cylinders or may be incorporated into the fuel pump and meter arrangement. The valve unit has been assumed to be of the solenoid operated type in each of the embodiments shown in FIGS. 3, 4 and 6 but, if desired, the valve unit may be of the type driven by a servo-motor or of the type using a diaphragm arrangement responsive to the intake manifold vacuum. In each of the embodiments illustrated in FIGS. 1 and 3, it has been assumed that the air-to-fuel ratio of the mixture to be produced in the mixture supply system is controlled by regulating the flows of air to be admixed to the fuel in the main and low-speed fuel delivery circuits but essentially similar effects will be achieved if the flows of fuel in the circuits or the flows of both fuel and air in the circuits are regulated on the basis of the analog signal delivered from the exhaust sensor. In the embodiment of FIG. 6, furthermore, the first and second breaker units 148 and 148' of the contact set assembly 140 have been described and shown to be operated by the breaker cams 150 and 150' respectively associated therewith, but, if desired, the breaker arms of the two units may be driven by a single breaker cam which is common to the breaker units.

What is claimed is:

1. An internal combustion engine comprising a mixture supply system for producing a mixture of air and fuel to be delivered into the engine cylinders, an exhaust system having therein a catalytic converter which is reactive to at least one type of air-contaminative compound in the exhaust gases passed through the exhaust system and which is capable of producing a maximum conversion efficiency against the exhaust gases resulting from a mixture having a predetermined air-to-fuel ratio, an exhaust sensor for detecting the concentration of at least one chemical component in the exhaust gases passed through the exhaust system and producing an output signal representative of the detected concentration of said chemical component, control means responsive to the output signal of said exhaust sensor for regulating the air-to-fuel ratio of the mixture to be produced in said mixture supply system toward said predetermined air-to-fuel ratio on the basis of said signal, detecting means for detecting engine temperature and producing an output signal representative of the detected engine temperature, a control circuit responsive to the output signal of said detecting means for producing an output signal when the signal from the detecting means is indicative of an engine temperature lower than said predetermined level, an ignition system including a vacuum spark advance mechanism to produce vacuum advance responsive to the vacuum developed in the engine intake manifold through a vacuum passageway, ignition timing retarding means including valve means electrically connected to said control circuit and operable to interrupt the communication between the vacuum advance mechanism and the intake manifold through said vacuum passageway and provide communication between the vacuum advance mechanism and the open air in response to the output signal delivered from said control circuit whereby said vacuum advance mechanism is disabled from producing the vacuum spark advance in the presence of the output signal from said control circuit, said valve means comprising a valve chamber formed with an air inlet port open to the atmosphere and an air outlet port in communication with said vacuum passageway, a valve element movable in said valve chamber between a first position to close said air inlet and outlet ports and a second position opening the air inlet and outlet ports concurrently for providing communication therebetween, said valve element being in the first and second positions thereof in the absence and presence, respectively, of the output signal from said control circuit, and a plunger with a conical free end movable together with said valve element between a position to provide vacuum communication through said vacuum passageway in response to the movement of said valve element into said first position thereof and a position to block said vacuum communication by the abutment of said conical free end onto a corresponding conical passage portion in said vacuum passageway and provide air communication between the vacuum advance mechanism and the atmosphere through said air inlet and outlet ports in response to the movement of said valve element into said second position thereof.

* * * * *